Patented Sept. 13, 1932

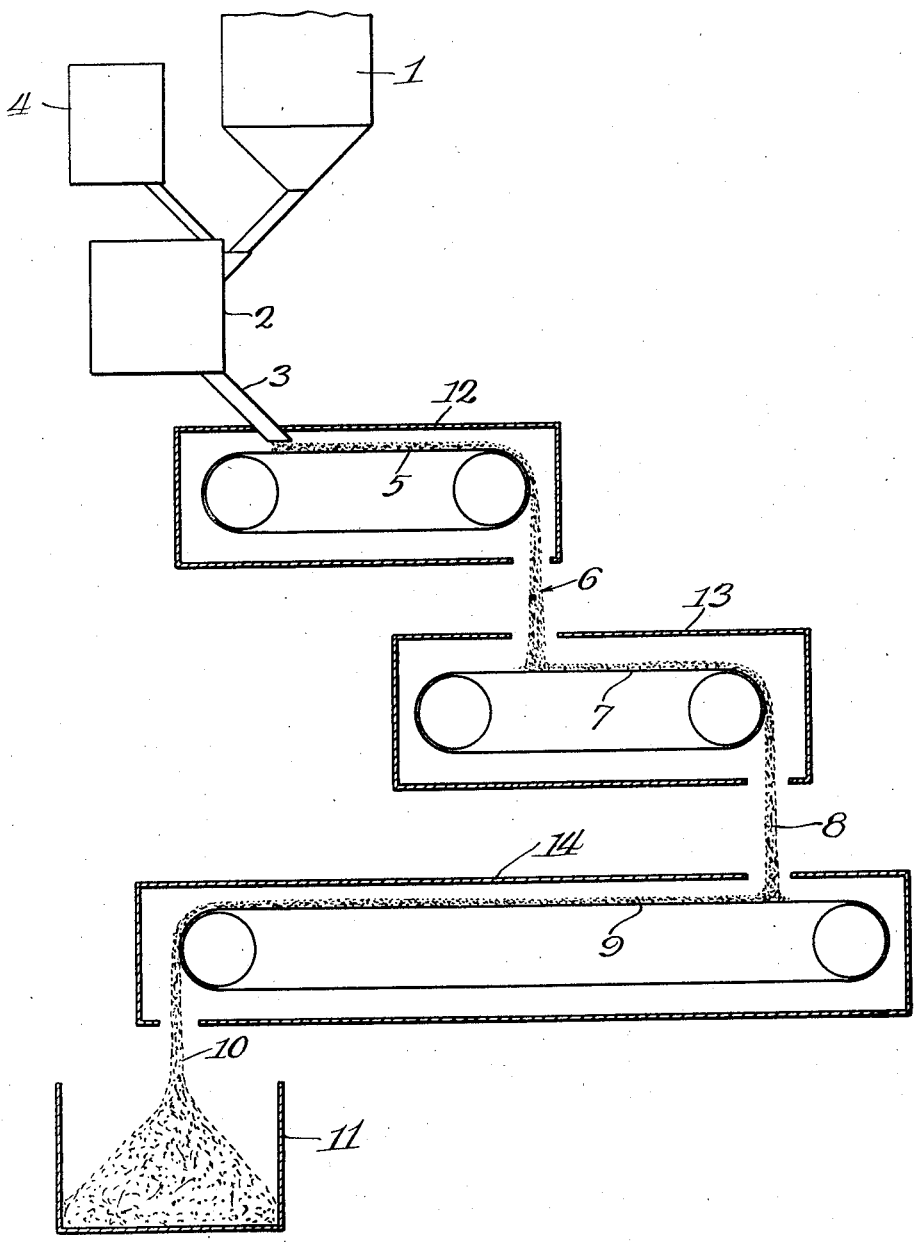

1,876,630

UNITED STATES PATENT OFFICE

PAUL S. DENNING, OF JOLIET, ILLINOIS, ASSIGNOR TO FREDERIC E. SCHUNDLER, OF JOLIET, ILLINOIS

PROCESS OF COLORING GRANULAR AND OTHER MATERIAL

Application filed March 3, 1930. Serial No. 432,634.

This invention relates to a method and means of coloring granules and one of the objects of the invention is to obviate the necessity for a high degree of heat.

Another of the objects of the invention is to retain the brilliancy of color unchanged.

Another of the objects of the invention is to produce a coating which may be applied uniformly and easily.

Another of the objects of the invention is to produce a coating which will require the minimum of handling in the plant.

These and other objects of the invention will be evident to those skilled in the art, from the description in the attached specification and the appended claims:

In the drawing, the figure is a diagrammatic representation in which the various elements and machines, necessary in my process for coloring granules, are indicated by symbols later to be described.

Granules of various colors find wide use in roofing material, and because of the necessity of presenting a pleasing and uniform appearance on a roof, brilliant color and a uniform tone are essential.

It is common practice in applying color to granules to use some bonding material which requires dehydration and consequently a rather high degree of heat. The effect of heat is serious for three reasons: first, the brilliant color of the pigment may be due to a hydrated form of pigment molecule so that on the dehydration of the bonding material, the color itself is partially dehydrated and its brilliancy hurt. Second, at the high temperatures necessary to set the bond, a reaction between the bonding material and the pigment material may occur which again destroys the brilliancy of the color. The third difficulty is that of manufacturing expense, since heating is a relatively costly process.

I have avoided the difficulties enumerated above by the use of cement for holding the color on the surface of the granule. In cement which does not require dehydration, any high degree of heat or any further chemical treatment to insure an insoluble weather-resisting bond comes within the scope of my invention.

In particular, I may use Portland cement, Sorrel cement, or any cement formed by the insoluble oxy-salts.

The material which I shall describe, which is by way of example only, is the cement formed by the chemical action of magnesium chloride on magnesium oxide.

In carrying out my invention, I mix dry color with calcined magnesite. The dry mixed pigment is in turn mixed with a solution of magnesium chloride, (preferably about 22° Baumé) to form a thin, watery paste. Granules, which have been previously screened to select the proper size, are then put in a mixer of any of the convenient commercial types and the coloring solution run in. This has proved to be a more practicable process than adding granules to the coloring solution, since lumping and sticking is obviated. Mechanical mixing is continued until all of the granules have been thoroughly covered with a coloring fluid and then the mixture is poured out and preferably mildly heated to accelerate the setting of the cement, and simultaneously, it is agitated to prevent the agglomeration of the mass. This may be accomplished by conducting the mass from the mixer along a series of short belts which are surrounded by heating chambers. The belts are arranged at different levels and the granules in falling from one belt to another will be broken up and agitated sufficiently to prevent sticking.

A mechanism for coating, agitating and heating the granules is shown diagrammatically on the drawing, in which the numeral 1 indicates a storage bin for the granules. 2 indicates a mechanical mixer; 3, a chute through which the material is discharged; 4, a color vat in which the previously mixed calcined magnesite and dry color is mixed with the magnesium chloride solution; 5 indicates a short belt conveyor; 6, a gap between the conveyor and a second like conveyor 7.

The system is duplicated, giving another space 8 though which the material must fall, and a third conveyor belt 9 discharges the material, after falling through the space 10, into the bin 11. The lines 12, 13 and 14 surrounding the belts indicate heating chambers. It will, of course, be understood that the representation is diagrammatic only and it may be necessary to cause the material to be broken up and agitated by several more drops and stirrings than the diagrammatic representation shows. The figure is sufficient, however, to indicate the means and arrangement with which I accomplish my purpose.

It will be noticed that at the end of the belt 5, the material must fall through a considerable space and is caught on the moving belt 7 below. The purpose of the belts and of the dropping of the material between the belts is to prevent the granules from sticking and conglomerating while the cement is wet. Very mild stirring is sufficient to prevent such sticking and I find dropping from belt to belt a practical expedient in preventing this difficulty.

At the same time that the material is traveling over the belts, I prefer to heat it to a mild degree. The temperature in the heating chambers, indicated at 12, 13 and 14, may be about 100° F. to 125° F. The purpose of the heating is solely to accelerate setting of the cement. It is not meant to dry or dehydrate the mass, and consequently the chambers 12, 13 and 14 may be practically closed.

The time during which the granules will adhere together depends upon the nature of the calcined magnesite used. It varies through rather wide limits, but I find as a matter of practical experience that a heating time of from thirty to forty-five minutes is entirely sufficient to produce an initial set, and that after this time, there is no danger of the granules sticking together.

Heating is not an essential element in the process and may be dispensed with if time is of small importance. The material after coating with the color and cement mixture might be spread out on a dry floor, raked occasionally to prevent sticking and after three or four hours would present the same appearance as material which has been treated by the heating process above described.

As a particular example of the mixture used in my invention, I find that the following will produce an excellent buff colored granule: Ten pounds of hydrated yellow, iron oxide is mixed with 100 lbs. of calcined magnesite or commercial magnesium oxide in a ball mill or by any suitable mechanical mixing device. To this dry mixture, 150 lbs. of 22° Baumé magnesium chloride is added. This produces a thin, sloppy mixture with the consistency of cream. To this mixture is added 2000 lbs. of granulated stone which has previously been brought to the desired size. After thorough mixing in the mixer 2, the material is heated and agitated by the belt conveyors as previously described.

I find that the above process produces a uniformly colored, brilliant buff granule which withstands weather and exposure extremely well.

The formula given above is by way of example only and it will be understood that when other colors are required, or deeper shade of the buff color desired, the proportions as given may vary widely and still not depart from the spirit of the invention herein described.

Where Portland cement is used the same general scheme may be followed, that is, the pigment may be first mixed with the cement and then water added to reduce the mass to the proper consistency after which the granules are added and the mass agitated and dried as described above.

What I claim, therefore, is:

1. A process for applying color to roof granules which comprises sizing the granules, mixing the color pigment with calcined magnesite, mixing the combined pigment and calcined magnesite in turn with a solution of magnesium chloride, adding this mixture to the prepared granules, mixing the mass, agitating the mass, in the meanwhile subjecting the treated granules to a mild degree of heat to accelerate the setting of the cementing medium.

2. In a roofing granule, a granule of rock, finely ground color pigment on the surface of the rock, and a bond securing the pigment thereto, composed of Sorrel cement.

3. A new article of manufacture comprising a roofing granule composed of rock, a coating of color applied thereover and bonded thereto by Portland cement.

4. A process for coloring granules which consists in mixing a cement comprising calcined material and water with color pigment, mixing the colored cement with granules, drying and simultaneously agitating the mixed mass to prevent agglomeration.

In testimony whereof I affix my signature.

PAUL S. DENNING.